United States Patent
Ghosh et al.

(10) Patent No.: US 6,353,283 B1
(45) Date of Patent: Mar. 5, 2002

(54) IMPLOSION-RESISTANT CATHODE RAY TUBE ENVELOPE

(75) Inventors: Asish Ghosh, Slingerlands; Suresh T. Gulati, Elmira, both of NY (US)

(73) Assignees: Corning Incorporated, Corning; Philips Electronic North America Corporation, Tarrytown, both of NY (US)

( * ) Notice: Subject to any disclaimer, the term of this patent is extended or adjusted under 35 U.S.C. 154(b) by 0 days.

(21) Appl. No.: 09/284,721

(22) PCT Filed: Oct. 20, 1997

(86) PCT No.: PCT/US97/18684

§ 371 Date: Apr. 16, 1999

§ 102(e) Date: Apr. 16, 1999

(87) PCT Pub. No.: WO98/18151

PCT Pub. Date: Apr. 30, 1998

(51) Int. Cl.[7] .......................... H01J 31/00; H01J 29/10; H01J 9/00; H01J 9/24; H01J 9/26
(52) U.S. Cl. .................. 313/477 R; 313/461; 313/466; 313/478; 313/479; 445/24; 445/25
(58) Field of Search ................................ 313/461, 466, 313/477 R, 478, 479, 634, 635, 482; 220/2.1 A, 2.3 A; 348/821, 822; 445/24, 25

(56) References Cited

U.S. PATENT DOCUMENTS

| | | | | |
|---|---|---|---|---|
| 5,304,890 A | * | 4/1994 | Tsukui et al. ........... | 313/477 R |
| 5,445,285 A | * | 8/1995 | Suguwara et al. ....... | 220/2.1 A |
| 5,466,984 A | * | 11/1995 | Gotoh .................... | 313/477 R |
| 5,536,995 A | * | 7/1996 | Sugawara et al. ...... | 313/477 R |
| 5,536,996 A | * | 7/1996 | Vijlbrief ................. | 313/477 R |
| 5,547,409 A | | 8/1996 | Nakamura et al. ............. | 445/8 |

* cited by examiner

Primary Examiner—Ashok Patel
Assistant Examiner—Mack Haynes
(74) Attorney, Agent, or Firm—Milton M. Peterson

(57) ABSTRACT

A glass envelope for a cathode ray tube (10) and a method of production. The envelope comprises (12) a panel member having a thickness (t) that is defined by an equation which involves net tensile stress; wherein the panel having a net tensile stress not exceeding 1150 psi, having a surface compression induced during panel manufacture, and having an implosion protection band (30) shrink-fitted around a skirt (20) on the panel that augments surface compression in the panel (12), whereby the panel thickness is substantially less than that of a corresponding untreated tube envelope.

11 Claims, 1 Drawing Sheet

IMPLOSION-RESISTANT CATHODE RAY TUBE ENVELOPE

FIELD OF THE INVENTION

Figure 1:
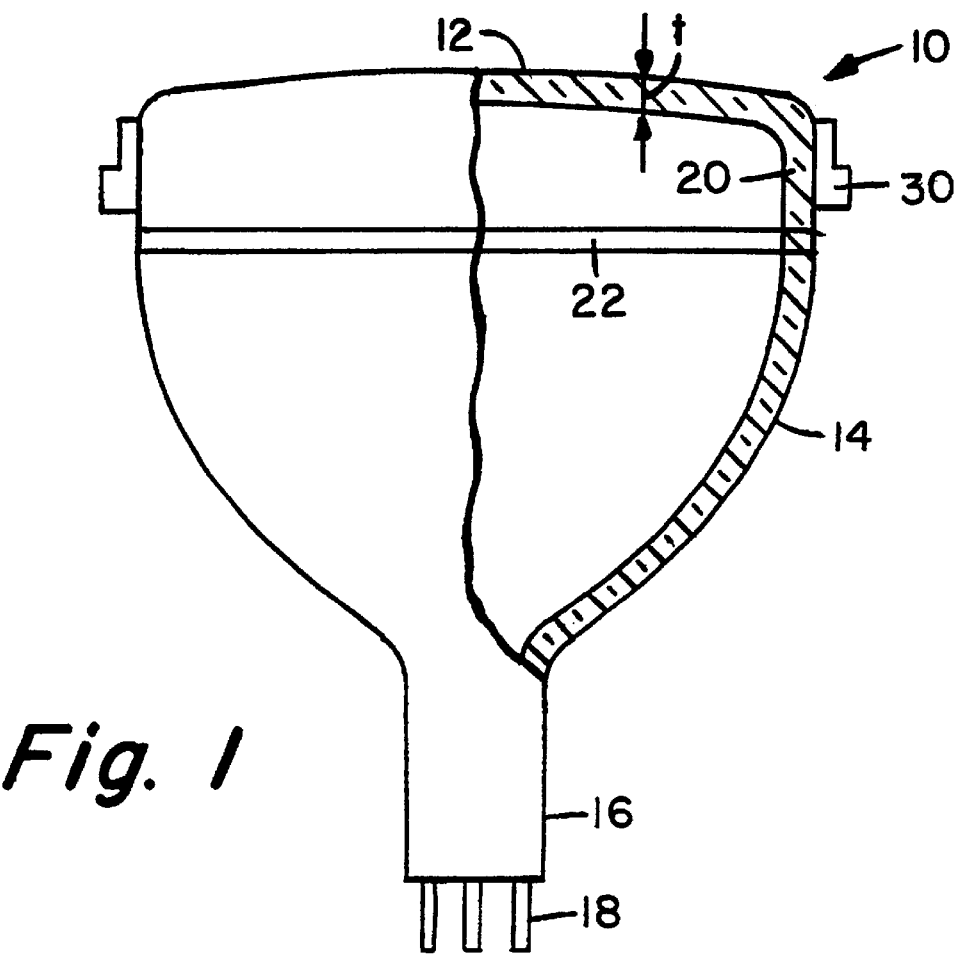

An envelope for a cathode ray tube, especially the panel or face plate thereof.

BACKGROUND OF THE INVENTION

A cathode ray tube customarily has a glass envelope which is evacuated and hermetically sealed for tube operation. The envelope comprises a viewing panel member, a funnel member and a tubular neck member. An electron gun is mounted in the neck member.

The panel member is often referred to as a face plate, or a display window, since it provides a screen on which a picture or display is formed. Normally, the panel member has a depending, peripheral skirt that is sealed to the funnel member with a fused sealing material.

Since a tube operates in an evacuated state, there is a pressure difference of one atmosphere across the panel. This creates a risk of implosion when flaws develop as the glass cools, or are caused by scuffs or scratches during handling. To counter this, the panel thickness is increased. Normally, glass thickness in the panel is greater than that in the funnel and neck member, since these members are less prone to damage and are not exposed during tube operation.

The ever increasing demand for larger picture tube size has led to larger and larger panels. Coincident therewith has been the increase in panel and tube weight. This has led to difficulty in handling the heavy ware without damage. It has also entailed longer times and more energy to process the panel and the tube, thus adding to the cost. This has led to a strenuous search for an alternative to increased panel thickness as a protection against implosion.

Numerous proposals have been made to use a so-called implosion protection band. Such a band tightly encircles the skirt portion of the panel, and may be adherently sealed thereto. The protection band may be composed of metal or other strong materials.

It is also known to strengthen glass by tempering. This practice is commonly employed for such diverse items as automotive glazing and glass cookware. Glass may be thermally tempered by blowing cooling air on the surface. This accelerates setting of the surface glass, thereby inducing compressive stresses therein. An alternative practice, chemical tempering, has been proposed. In this procedure, ion exchange is employed to create compression by crowding ions in the glass surface.

The present invention is directed to producing an improved envelope for a cathode ray tube. In particular, it is directed to the production of larger sized tubes in excess of a 19" panel dimension. It is further directed at minimizing the glass thickness in a cathode ray tube (CRT) panel while maintaining full protection against implosion. It is also directed to a method of producing a panel for a cathode ray tube that has minimum thickness consistent with full protection against implosion.

SUMMARY OF THE INVENTION

The article of the invention is a glass envelope for a cathode ray tube comprising a panel member having a thickness (t) defined by the equation:

$$(\sigma)_P = kP(a/t)^2$$

wherein $(\sigma)_P$ is the net tensile stress in the panel, (a) is one half the length of the minor axis in inches, (t) is the panel thickness in inches, (P) is atmospheric pressure in psi and (k) is a structural constant based on tube geometry. The panel has a net tensile stress not exceeding 1150 psi, a surface compression induced during panel manufacture, and an implosion protection band shrink-fitted around a skirt on the panel that augments surface compression in the panel, whereby the panel thickness is substantially less than that of a corresponding untreated tube envelope.

The invention further resides in a method of reducing the thickness of a panel member in a cathode ray tube glass envelope wherein the thickness (t) is defined by the equation $(\sigma)_P = kP(a/t)^2$ wherein $(\sigma)_P$ is the maximum tensile stress in the panel, the method comprising imparting compression in the panel surface by treatment of the surface, and augmenting this compression by shrink-fitting an implosion protecting band about a skirt on the panel, while maintaining the value of $(\sigma)_P$ at not over 1150 psi, thereby permitting a reduction in panel thickness from that in an untreated panel.

PRIOR ART

Literature of possible interest is listed on an attached document.

BRIEF DESCRIPTIONS OF THE DRAWINGS

FIG. 1 in the accompanying drawing is a side view, partially cut away, illustrating a cathode ray tube in accordance with the invention.

Figure 2:
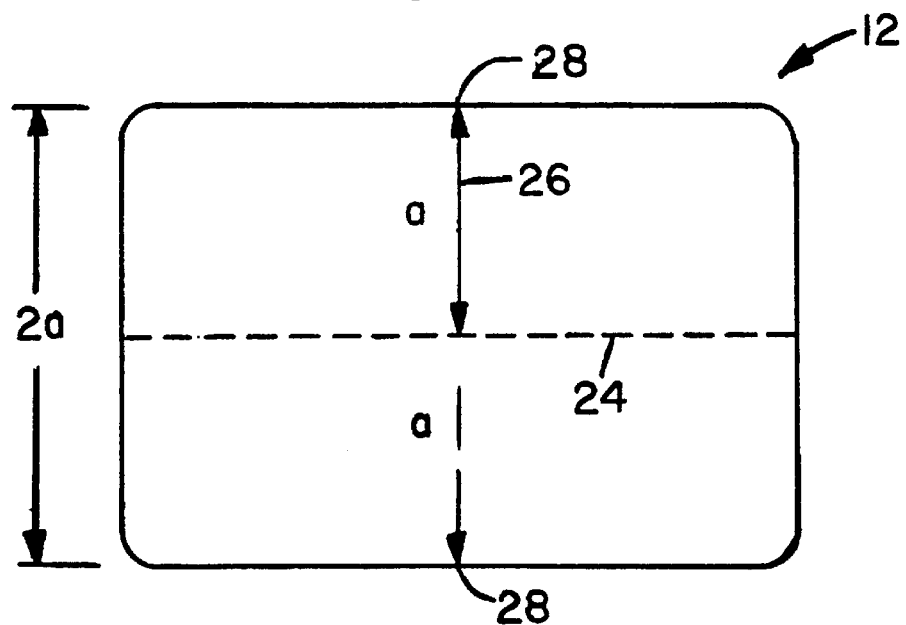

FIG. 2 is a top plan view of the panel member of FIG. 1.

DESCRIPTION OF THE INVENTION

The invention is concerned with the glass envelope employed in producing a cathode ray tube. It is particularly concerned with the viewing panel member of such glass envelope. Both the tube and the envelope are commonly identified by the geometry of the panel member. The present invention is not limited to any particular tube geometry. However, it was developed in connection with the popular rectangular envelope, and is so described.

FIG. 1 is a side view, partially cut away, illustrating a cathode ray tube construction generally designated 10. Tube 10 comprises the standard glass envelope members: viewing panel 12, funnel 14 and tubular neck 16. Electron gun 18 is mounted in neck member 16. Other tube components, not relevant to the present invention, such as a phosphor screen and a shadow mask, are omitted in the interest of clarity.

Viewing panel 12 has a depending skirt portion 20. Panel 12 is joined to funnel 14 by a fusion seal 22 between the rims of skirt 20 and funnel 14.

When tube 10 is evacuated, there exists a pressure differential of approximately one atmosphere between the external ambient and the internal pressure of essentially zero. The differential occurs over the entire tube surface, but is of particular concern with respect to panel 12 because of its exposure in a mounted television set. This differential creates a tensile stress across the panel. This tensile stress must be limited to avoid the propagation of surface flaws, and consequent collapse of the tube envelope.

FIG. 2 is a top plan view of rectangular panel member 12 showing the major axis 24 and the minor axis 26 in dashed lines. It has been found that the gusset region 28 near the end of minor axis 26 experiences the highest stress and is the weakest region in the panel. This is, the expected source of breakage initiation if and when breakage occurs.

Extensive studies have shown that implosion can be averted by limiting the net tensile stress across panel 12 to 1150 psi. Tests on hundreds of test pieces maintained at or below this stress level showed no breakage even on badly abraded samples. However, at higher levels, e.g. 1400 psi tensile stress, at least some breakage was encountered. Tensile stress $(\sigma)_P$, is determined in accordance with the formula:

$$(\sigma)_P = kP(a/t)^2.$$

It is evident that the permissible panel thickness (t) is dictated by the net tensile stress. The latter must not exceed 1150 psi. It is also evident that the panel weight, in turn, increases as the panel thickness increases. The present invention is aimed at reducing the thickness, and hence the weight, required to stay within the 1150 psi limit on tensile stress.

We have found that the normal thickness of a tube panel can be reduced by anywhere from 10–35% depending on the consistency of manufacturing conditions. To accomplish this, we combine two means of inducing surface compression in the exterior surface of panel 12.

Rapid cooling of panel member 12 during production can introduce significant levels of compression in the panel surface. Depending on the prevailing conditions, surface compression levels ranging from 450–1650 psi can be introduced. To some extent, this surface compression may be lost during the thermal treatment inherent in an exhaust bake-out cycle. The tube is exposed to such cycle before being finally sealed. Allowing for a possible loss of up to 30%, compression stress values of at least 315–1155 psi may be retained. This compression stress counters a tensile stress value of 1150 psi to such an extent that the net tensile stress is 835 psi.

We have also found that a further increase in the compression stress level in the panel can be augmented by shrink-fitting an advanced form of metal band 30 around the skirt 20 of panel 12. In this manner, a compressive stress level of 170–290 psi can be introduced. This, in turn, decreases the net tensile stress to about 665 psi.

It will be appreciated that the normal desire is not to decrease the tensile stress. Rather, it is to decrease panel thickness, and thereby tube weight. Consequently, the practical effect of the present invention is to retain the maximum tensile stress of 1150 psi in a tube panel. Then, a permissible minimum panel thickness is calculated employing the formula stated earlier. This calculation reveals that the normal thickness of an untreated envelope panel can be reduced by as much as 25%. Thus, a panel cooled in normal manner, and having a thickness of ½", can have its thickness reduced to ⅜".

While various types of shrink-fit rim bands may be employed, we have found best results with a welded connector plate type rim band. This type of band is described in a publication entitled, "Evaluation of Fabrication and Reliability of Metal Band Joining Techniques for Long Term Safety of CRTs" by Keith Guenther et al. in the May 21, 1996 issue of '96 Displayworks.

Air cooling is a preferred means of inducing the compression stress level in a glass panel. However, it will be appreciated that chemical tempering by ion exchange would be equally effective, albeit not as practical. Controlled release of forming stresses through heat treatment is also an effective way to introduce high surface compression in the CRT panel.

The invention is further described with reference to a test in which several groups of sealed and evacuated CRTs were compared. The tubes in each group had essentially identical physical characteristics, but each group had different characteristics. In particular, each group had a unique combination of Center Face Thickness (CFT) values and High Surface Compression (HSC) values.

Center Face Thickness is the thickness in inches at the center of the tube panel. High Surface Compression is the compression in psi induced in the panel to counter tension developed by the pressure differential. The test was carried out over a period of 100 days; all tubes were prepared in accordance with standard commercial practice; and all panels were lightly abraded to simulate expected use.

TABLE I below shows the characteristic CFT and HSC values for each group (incoming HSC value measured at seal edge); the number of tubes in each group; and the number that failed.

TABLE I

|   | CFT (in.)     | HSC (psi)   | # Tested | # Failed |
|---|---------------|-------------|----------|----------|
| A | 0.491 ± 0.006 | 1700 ± 100  | 10       | 0        |
| B | 0.491 ± 0.006 | 600 ± 100   | 8        | 8        |
| C | 0.521 ± 0.009 | 1700 ± 100  | 10       | 0        |
| D | 0.551 ± 0.009 | 600 ± 100   | 10       | 0        |
| E | 0.491 ± 0.006 | 1700 ± 100  | 9        | 0        |
| F | 0.491 ± 0.006 | 600 ± 200   | 10       | 4        |
| G | 0.491 ± 0.006 | 1200 ± 100  | 7        | 0        |
| H | 0.491 ± 0.006 | 1700 ± 100  | 10       | 0        |
| I | 0.521 ± 0.009 | 600 ± 100   | 9        | 0        |

It is apparent that, within limits, the CFT required varies inversely with HSC. Based on this and other tests, it has been determined that the CFT may vary upward from about 0.480" in a 27" panel while the HSC is varied between 600 and 1700 psi.

In addition, CRTs must pass impact tests. These tests are described in UL 1418, "Standard for Safety of CRTs" from Underwriters Lab, and in CAN/CSA-C22.2, No. 228–92, "Canadian Standards for CRTs".

The tests involve impact with a ball or missile of specified weight under specified conditions. They are designed to ensure the safety of viewers in case the CRT implodes due to heavy impact by a large object. The distance over which glass fragments are thrown out, in case of implosion, is limited by these tests to 0–5 ft. How far these fragments travel depends on two factors namely i) the size of the fragment and hence its mass, and ii) the energy to propel it.

The former is influenced by the compressive stress induced by the band since higher compression will keep several fragments locked together thereby increasing their mass. The latter is composed of three sources of energy namely i) energy due to vacuum, ii) energy due to bending induced by pressure differential, and iii) energy due to local deformation induced by compressive stress from the band. The first two components of total energy are dictated by the size of CRT and hence are relatively fixed, i.e., they cannot be varied. The third component, however, can be adjusted by controlling the compressive stress from the band by simply changing its width or thickness or both.

In addition to moderating the energy, the local deformation caused by the band alters the doming value of the panel at its center The doming value is the distance that the central point on a tube panel rises, that is, bows outwardly or upwardly due to applied compressive stress. It should be noted that the center of the panel moves inward upon evacuation while the band helps bring it back to its original position. Thus, doming is the recovery value. A certain amount of doming is a necessary result of imparting the desired stress. However, tests have shown that doming must be limited to pass the safety tests.

TABLE II sets forth the CFT and HSC values, as well as doming values measured on several sets of completed CRTs that were subjected to the UL and CSA tests. It also sets forth the width of the band employed to induce compression stress.

TABLE II

| Tube Set | CFT (in.) | HSC (psi) | Doming (mm) | Bandwidth (in.) | # Tested | # Failed |
|---|---|---|---|---|---|---|
| 1 | 0.491 | 1700 | 0.121 | 1.496 | 15 | 1 |
| 2 | 0.491 | 600 | 0.110 | 1.496 | 15 | 0 |
| 3 | 0.521 | 1700 | 0.103 | 1.496 | 15 | 0 |
| 4* | 0.551 | 600 | 0.104 | 1.496 | 15 | 0 |
| 5 | 0.491 | 1700 | 0.128 | 1.496 | 15 | 1 |
| 6 | 0.541 | 1700 | 0.110 | 1.496 | 8 | 0 |
| 7 | 0.607 | 1700 | 0.095 | 1.496 | 8 | 0 |
| 8 | 0.541 | 1700 | 0.094 | 1.378 | 22 | 0 |
| 9 | 0.607 | 1700 | 0.088 | 1.378 | 4 | 0 |

The implosion test data, summarized in TABLE II, clearly show that too high a doming value, i.e., greater than 0.110 mm, caused by the standard band of 1.496" width, does not permit CRTs with center face thickness of 0.491" to pass the implosion test.

It is also evident that the band plays a dual role. In addition to inducing compressive stress in the panel, control of the band width controls doming, that is, the strain energy due to bending. Reducing the band width to 1.378" results in lower compression and less doming which help pass the implosion test as noted in TABLE II. Thus for thinner panels, within the tolerance band of thickness specs, a narrower band is required to pass the implosion test.

Based on the foregoing tests, we find that the band width of the metal band applied to a panel skirt of a 27 inch CRT panel should fall in the range of 1.378 to 1.496 inches. Also, to insure passing the UL and CSA safety tests, the domning value should be in the range of 0.088 to 0.110 mm.

We claim:

1. A glass envelope for a cathode ray tube comprising a panel member having a thickness (t) defined by the equation:

$$(\sigma)_P = kP(a/t)^2$$

wherein $(\sigma)_P$ is the net tensile stress in the panel,
   (a) is one half the length of the minor axis in inches,
   (t) is the panel thickness in inches,
   (P) is atmospheric pressure in psi,
   (k) is a structural constant based on tube geometry,
the panel having a net tensile stress not exceeding 1150 psi, having a surface compression induced during panel manufacture, and having an implosion protection band shrink-fitted around a skirt on the panel that augments surface compression in the panel, whereby the panel thickness is substantially less than that of a corresponding untreated tube envelope.

2. An article in accordance with claim 1 wherein the panel member has a rectangular geometry.

3. An article in accordance with claim 1 wherein the surface compression induced during panel manufacture is in the range of 450–1650 psi.

4. An article in accordance with claim 1 wherein the surface compression induced by the implosion protection band is in the range of 170–290 psi.

5. An article in accordance with claim 1 wherein the implosion protection band is a welded connector plate type.

6. A method of reducing the thickness of a panel member in a cathode ray tube glass envelope wherein the thickness (t) is defined by the equation $(\sigma)_P = kP(a/t)^2$ wherein $(\sigma)_P$ is the net tensile stress in the panel,
   (a) is one half the length of the minor axis in inches,
   (t) is the panel thickness in inches,
   (P) is atmospheric pressure in psi,
   (k) is a structural constant based on tube geometry,
the method comprising imparting compression in the panel surface by treatment of the surface, and augmenting this compression by shrink-fitting an implosion protecting band about a skirt on the panel, while maintaining the value of $(\sigma)_P$ at not over 1150 psi, thereby permitting a reduction in panel thickness from that in an untreated panel.

7. A method in accordance with claim 6 which comprises imparting a level of compression in the range of 450–1650 psi in the panel surface by treatment of the surface.

8. A method in accordance with claim 6 which comprises chilling the exterior surface of the panel to cool it at a faster rate than the interior and thereby imparting compression in that surface.

9. A method in accordance with claim 6 which comprises controlled release of forming stresses thereby providing compression in that surface.

10. A method in accordance with claim 6 which comprises shrink-fitting a welded connector plate type rim band about the skirt on the panel.

11. A method of producing a panel for a cathode ray tube which comprises pressing a glass panel having a desired shape and a thickness (t) defined by the equation $$(\sigma)_P = kP(a/t)^2$$

wherein $(\sigma)_P$ is the net tensile stress in the panel,
   (a) is one half the length of the minor axis in inches,
   (t) is the panel thickness in inches,
   (P) is atmospheric pressure in psi,
   (k) is a structural constant based on tube geometry,
the thickness being such that net tensile stress in the panel does not exceed 1150 psi under one atmosphere pressure, chilling the exterior surface of the panel as it cools or controlling the release of forming stresses to impart compression in the surface, and shrink-fitting an implosion protecting band about a skirt on the panel to augment the compression level in the panel, the combined compression levels decreasing the net tensile stress in the panel when the CRT is placed under one atmosphere of pressure to not over 1150 psi.

* * * * *